April 17, 1956 D. J. OLDENBOOM 2,741,960

RECORD CONTROLLED PRINTER

Filed Dec. 29, 1954 3 Sheets-Sheet 1

INVENTOR.
DERK J. OLDENBOOM

BY J. Jancin Jr.

ATTORNEY

April 17, 1956 D. J. OLDENBOOM 2,741,960

RECORD CONTROLLED PRINTER

Filed Dec. 29, 1954 3 Sheets-Sheet 3

United States Patent Office 2,741,960

Patented Apr. 17, 1956

2,741,960

RECORD CONTROLLED PRINTER

Derk J. Oldenboom, Johnson City, N. Y., assignor to International Business Machines Corporation, New York, N. Y., a corporation of New York Application December 29, 1954, Serial No. 478,330

10 Claims. (Cl. 95—1.7)

This invention relates to record controlled machines in general, and to the record feeding means thereof in particular.

The preferred embodiment of this invention is shown and described for use in a xerographic printing machine for transferring onto a print receiving web, sheets or cards, a duplicate powder image of the information appearing on source records. As is well known to persons familiar with this phase of the graphic arts, xerography is a term applied to a printing process in which latent electrostatic images of data to be printed are rendered visible by a pigmented electroscopic powder often termed xerographic toner, the resulting developed toner image being transferred and thereafter affixed to a print receiving material.

Very often it is desirable to print a plurality of duplicate copies of information appearing on the face of a single source record. One obvious way of producing as many duplicate copies as may be desired is to rerun the source record through the print duplicating machine an equal number of times as there are duplicate copies needed. This type of operation may be objectionable because it is an extremely slow one since it would require separate record sorting steps in order to group the source records into categories in accordance with the number of duplicate copies to be printed. Certainly, one of the most desirable ways in which to accomplish this type of operation would be to print as many duplicate copies as are needed for each source record during a single pass of the source records through the print duplicating machine, and without regard to the fact that each source record might call for a different number of duplicate copies thereof.

As will be described in detail hereinafter, the source records having the information thereon to be duplicated as well as "number-of-copies" data, are fed past a record data reading station and an optional information scanning station in the preferred embodiment of this invention. Thus, the information bearing surface of each source record is scanned at least once to provide at least one duplicate copy thereof. In accordance with the digit value of the so-called number-of-copies data recorded on each source record, every such record may be moved past the optical scanning station a corresponding number of times prior to being advanced into the record stacker. If more than one duplicate copy is to be printed, the particular source record is diverted away from the normal path to the record stacker, and into a second feed path for recirculating the given source record to a point in the first or normal feed path whereby the record is caused to pass the optical scanning station again. The source record which is to be duplicated a plurality of times will, of course, be directed into the aforesaid second card feed path as many times as duplicate copies thereof in excess of one are desired so that the record will be moved past the optical scanning station a corresponding number of times.

A main object of this invention is to provide an improved duplicating machine for printing a plurality of copies of a source record efficiently and rapidly.

Another object of this invention is to provide a record card controlled duplicating machine for printing a plurality of copies of the information on a record card in accordance with the "number-of-copies" data carried on the record card.

Another broad object of this invention is to provide an improved record feeding mechanism for moving a record past a particular point in the record feed path a plurality of times during a single pass of the record from a feeding station therefor to a receiving station.

A still another object of this invention is to provide a record card distributing mechanism for directing a record card into a receiving station when only one copy thereof is to be printed and into a recirculation path whereby the record card will be returned to said mechanism when more than one copy is to be printed.

Another object of this invention is to provide apparatus in a xerographic printer for marking for identification purposes select ones of the duplicate copies printed.

Other objects of the invention will be pointed out in the following description and claims and illustrated in the accompanying drawings, which disclose, by way of examples, the principle of the invention and the best mode, which has been contemplated, of applying that principle.

*General description*

Figure 1:
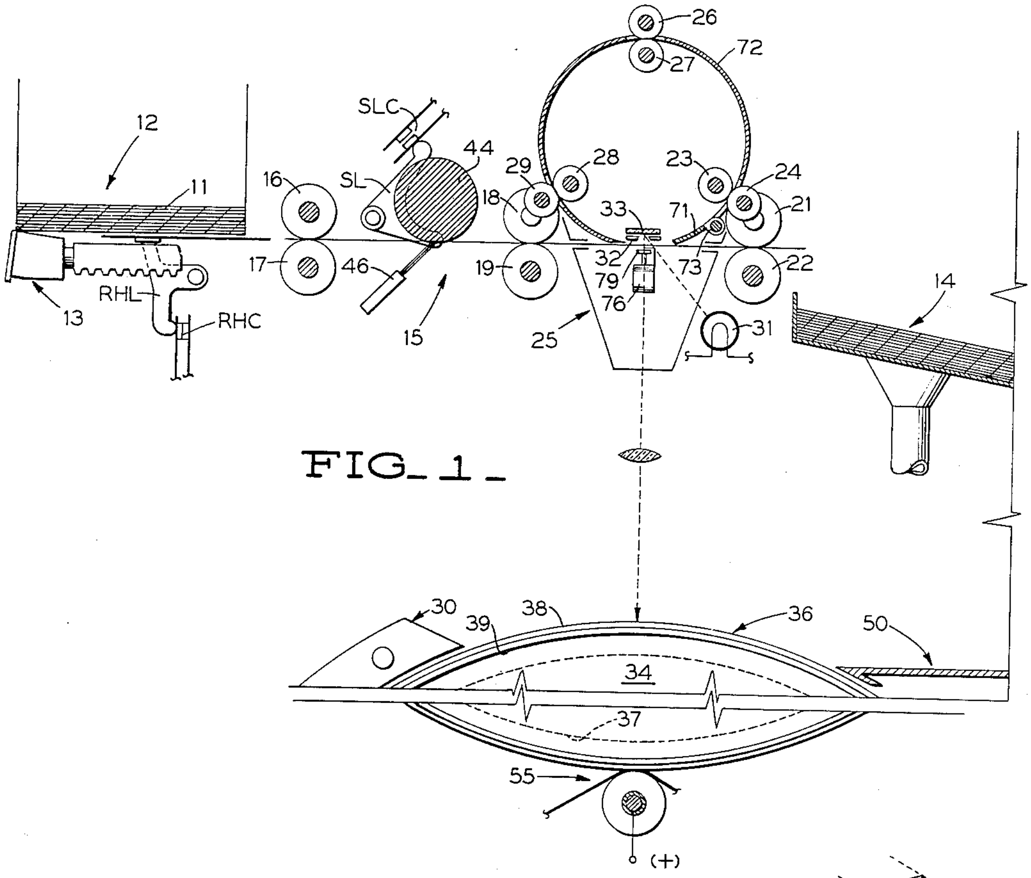
Fig. 1 is a somewhat diagrammatic view of the record card feeding mechanism for a record card controlled electrophotographic printer.
Figure 3:
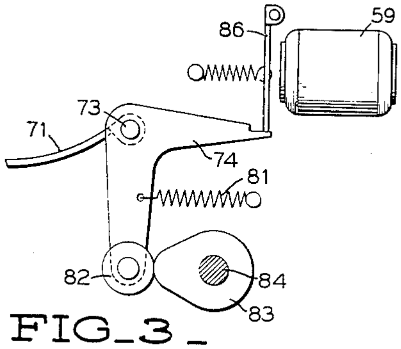
Fig. 3 is a front elevation of the record card distributing mechanism.

Referring to Fig. 1, source record cards 11 to be operated on are stacked in hopper 12, and are fed, one by one, by a conventional picker mechanism 13 of the type shown in Fig. 3 of Lake Patent No. 2,032,805 which issued on March 3, 1936, each card feed cycle out of card hopper 12 past sensing station 15 towards stacker 14. Successive pairs of feed rolls 16—19 and 21—22 cause cards 11 to be advanced along one card path past an optical scanning apparatus 25, whereas successive pairs of feed rolls 23—24, 26—27 and 28—29 cause select ones of cards 11 to be moved in a recirculatory path defined by member 72 back to the optical scanning apparatus.

Apparatus 25 includes a single light ray projector 31 which throws a concentrated band of parallel light rays upon the constricted center of the aperture in member 32. The opening in member 32 is sufficiently long in order to scan the printed information on a record card, which information is identified by the reference numeral 20 in Fig. 4. Inasmuch as the reflecting surface of a mirror 33 is over the aperture of member 32, the light band is caused to impinge upon the surface of xerographic drum 34 whenever there are no cards present between member 32 and mirror 33, whereby the electrically charged incremental areas of the photoconductive layer 38 are discharged.

Figure 4:
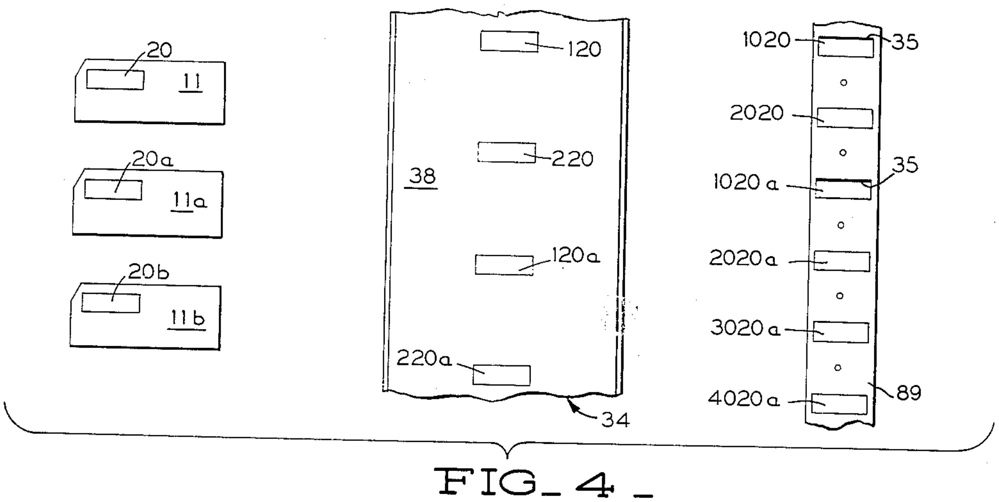
Fig. 4 is a flow diagram depicting generally the operations required in order to place the image of source record information upon a print receiving record.

As is shown in Fig. 4, each of the record cards 11—11*b* is shown to include printed information which is represented by the blocks identified by reference numerals 20—20*b*, respectively. Due to the fact that the surface of each record card has a light reflecting property, light rays are normally directed onto the surface of xerographic drum 34 as the cards are fed past apparatus 25 (see also Fig. 1) and between member 32 and mirror 33. Of course, when the printed information identified by reference numerals 20—20*b*, is brought into scanning alignment with the aperture of member 32, an optical image thereof is directed onto the surface of drum 34. Thus, it may be seen that apparatus 25 includes a somewhat conventional arrangement of light scanning structure for transferring an optical image of record card printed information onto the surface of xerographic drum 34. It may be pointed out at this time that this light scanning apparatus is similar to the one shown and described in the copending U. S. patent application, Serial No. 419,314, filed on March 29, 1954, by C. J. Fitch.

Inasmuch as the xerographic printing process does not form a part of this invention, the same will be described but briefly herein to avoid undue prolixity and unnecessary complexity. For a more detailed description thereof, reference may be had to the copending U. S. patent applications, Serial Nos. 419,392 and 419,702, filed respectively by I. M. Hix et al. and E. A. Barber, Jr., on March 29, 1954, and March 30, 1954, respectively. The xerographic drum 34 is mounted on a shaft (not shown) which is suitably supported in frame members (also not shown) for rotation in a counterclockwise direction, said shaft being driven by suitable motive means such as an electric motor, for example. The xerographic drum 34 includes an electrically conducting cylinder 37 and a printing element or so-called electrophotoplate 36 having a photoconductive insulating layer 38 which is carried by a sheet of any flexible metal or other conductive material 39 that enables its being flexed around and attached to the cylinder 37. The sheet 39 is secured to the cylinder in any of a number of conventional ways of attaching a printing plate to a supporting cylinder, such as by means of suitable clamping devices for example. It is necessary, however, that the backing sheet 39 be in good electrical contact with the electrically grounded drum cylinder 37. The electrically conductive backing sheet 39 is preferably coated with a light sensitive photoconductive insulating material, such as amorphous selenium for example, which may have a xerographic toner image produced thereon by the steps of electrically charging layer 38 by an ion-producing unit 30, exposing the same to an optical image so as to form a latent electrostatic image thereon, and dusting this latent image with a xerographic toner in station 50 so as to develop the same. This developed toner image can then be made into a permanent printing image by transferring and subsequently affixing the developed toner image onto a print receiving material such as a paper strip or separate records. A transfer apparatus 55 similar to that disclosed in the afore-mentioned copending Fitch patent application, is shown.

As stated previously, a record card may be diverted from the normal path to stacker 14, into a second feed path defined by member 72, for recirculating the given record card back to a point in the first or normal path whereby the record card is caused to pass the optical scanning apparatus 25 for another operation.

The record card distributing mechanism is shown in Figs. 1 and 3. Referring thereto, a card deflector 71 is fixed to a supporting shaft 73 which, in turn, is attached to a cam follower member 74. The ends of shaft 73 are loosely mounted in support bearings (not shown) arranged in frames (also not shown) in order that the cam follower assembly may pivot with the said shaft. A spring 81 is employed to bias cam follower member 74 in a direction whereby cam follower roller 82 may engage cam 83. The cam is fixed to a shaft 84 which is operated by drive mechanism 42 (see also Fig. 5). At approximately 230° of a machine cycle, magnet 59 may be energized, whereupon armature 86 will be attracted thereto. Cam 83 will at this time be in a position such that cam follower member 74 will pivot in a counterclockwise direction, whereby the card deflector 71 will be shifted to a new position such that the leading edge of a record card will pass over the deflector. At approximately 180° of each machine cycle, the high lobe of cam 83 operates against cam follower roller 82 to move the follower member 74 sufficiently in a clockwise direction to latch the member by the end of armature 86. The preceding action will raise the end of card deflector 71 above the card line so that a record card will be moved under the deflector and into stacker 14.

*Circuit description*

Figure 5:
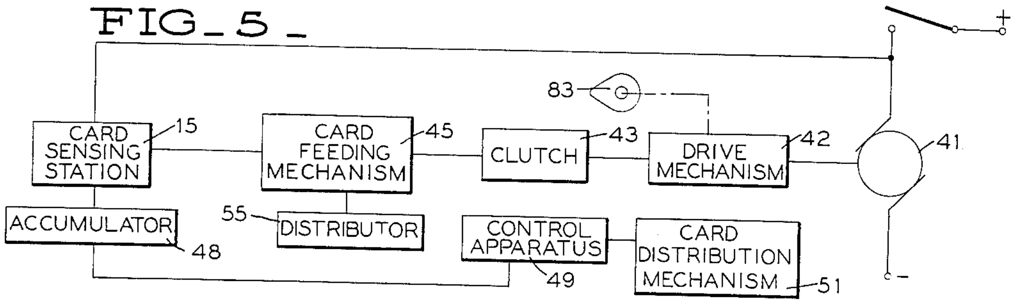
Fig. 5 depicts in block diagram form the arrangement of apparatus to govern source record feeding.

Referring first to the block diagram of the card feeding apparatus in Fig. 5, an electric motor 41 connected to a suitable power source through a line switch, is mechanically coupled to a drive mechanism 42 which is continuously operating so long as motor 41 operates. This drive mechanism is connected, in turn, to an electro-magnetically controlled clutch 43 which is connected to the card feeding mechanism shown in Fig. 1 to include card picker 13 and card feed rollers 16—17. It should be pointed out now that the other card feed rollers, i. e., rollers 18—19, 21—22, 23—24, 26—27 and 28—29, are directly coupled to the continuously operating drive mechanism and for this reason are also continuously operating. Referring once again to Fig. 5, the card feeding mechanism identified by reference numeral 45 causes cards to be moved up to a card sensing station 15 shown in Fig. 1 to be comprised of contact roller 44 and card data reading brushes 46. As will be brought out in detail hereinafter, the "number-of-copies" data read from the card at the card sensing station (Fig. 5) is directed to an accumulator 48, the said accumulator being adapted to govern a card feeding control apparatus 49. The apparatus 49 governs, in part, the operation of clutch 43 as well as the card distribution mechanism 51.

Figure 7:
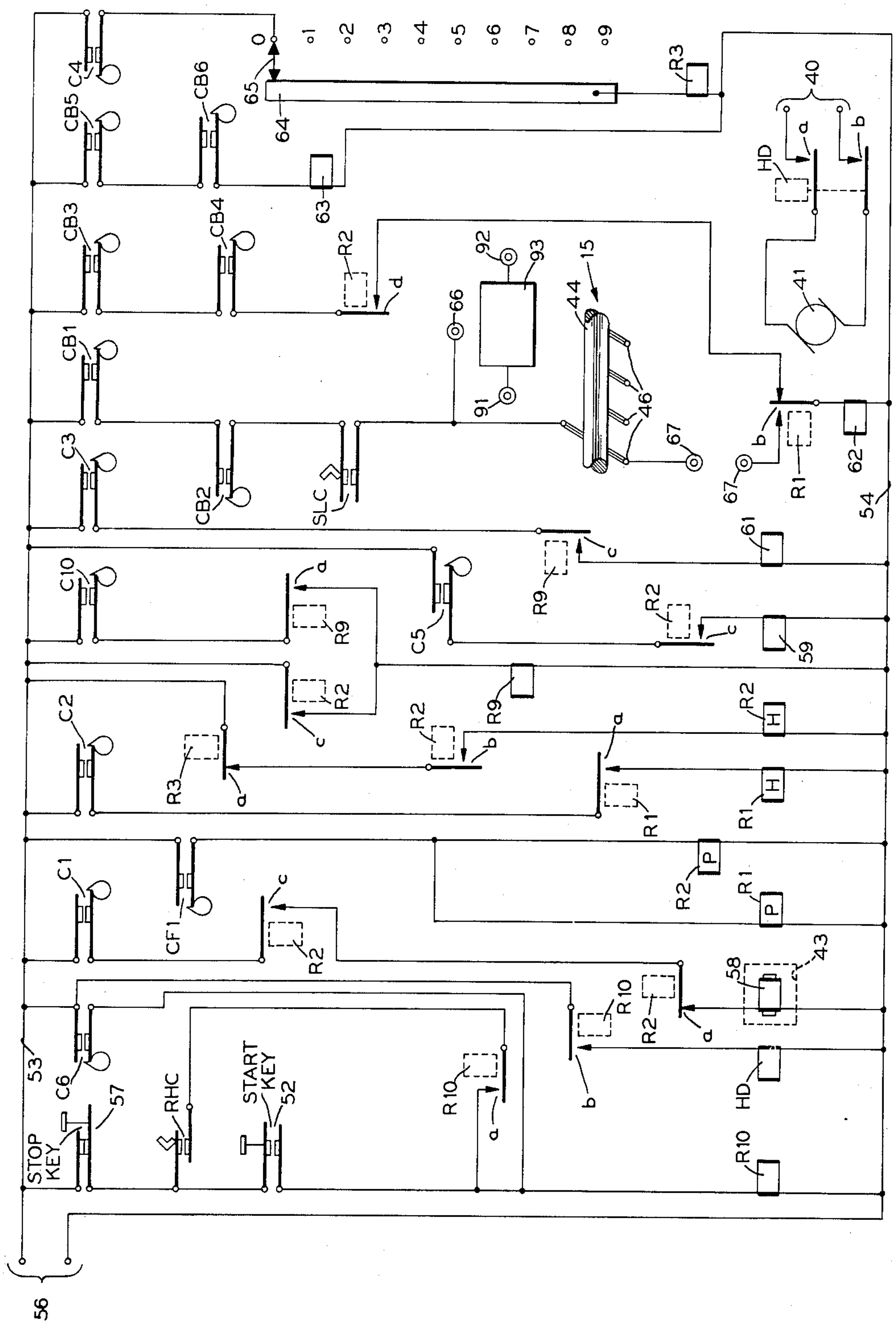
Fig. 7 is a wiring diagram of the apparatus for governing the feeding of source records.

When a group of record cards 11 is placed in hopper 12 (Fig. 1), the bottommost card operates upon a hopper contact lever RHL to close associated contacts RHC (see also Fig. 7). Depression of the start key will close normally open (n/o) contacts so that after cards have been placed in the stacker, a circuit will be completed to relay R10 from line 53 through stop key contacts 57, contact lever contacts RHC and start key contacts 52, and relay R10 to line 54. As is shown in Fig. 7, electrical supply lines 53 and 54 are connected to a suitable power source identified by the reference numeral 56. The energization of relay R10 will cause contacts R10*b* to close, whereupon a circuit will be completed to heavy duty motor relay HD. The contacts HD*a* and HD*b* are then closed to complete a circuit from power source 40 to electric drive motor 41 (see also Fig. 5). It may be seen that the hold circuit to maintain relay R10 picked is normally provided through stop key contacts 57, card lever contacts RHC and relay contacts R10*a*. This circuit will maintain relay R10 energized so long as cards are present in stacker 12 (see also Fig. 1) or until the stop key is operated to open contacts 57. Of course, after all of the cards 11 are moved out of stacker 12, contact lever contacts RHC will separate to open this relay R10 hold circuit. A sufficient card runout time is provided for by maintaining relay R10 energized after the afore-described hold circuit is opened, via cam contacts C6.

Figure 6:
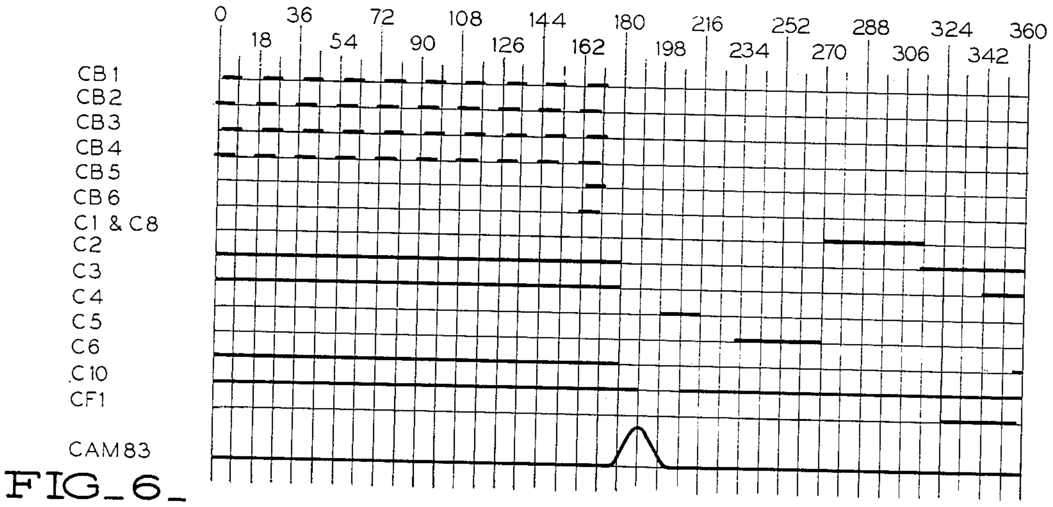
Fig. 6 is a timing chart.

Consequent upon the energization of relay R10, card feed clutch magnet 58 for controlling clutch 43 (see also Fig. 5) will be energized via a circuit from line 53 through contacts C1, R10*c* and R2*a*, to line 54. The energization of clutch magnet 58 will cause operation of the afore-described card feeding mechanism so that the first and bottommost record card 11 in card stacker 12 (see also Fig. 1) will be fed from the stacker into the bite of card feed rollers 16—17. During the first cycle, the card will be fed to a point just ahead of the card reading station 15. At 324° of the first card feed cycle, cam contacts CF1 (see Figs. 6 and 7) will close so as to energize relays R1P and R2P. It should be pointed out here that the C cams operate whenever driving mechanism 42 (see also Fig. 5) operates, whereas the CF cam operates only when clutch 43 is operated. Relay R1 will be maintained picked by the circuit to relay R1H via cam contacts C2 which make from approximately 312° to 180° and relay contacts R1*a*. Relay R2 will at this time be maintained picked via the normally closed (n/c) contacts R3*a* which control the circuit to relay R2H. Suffice it to say for the present that contacts R3*a* in the relay R2H circuit are closed only at a time corresponding with the scanning of the record card for making the last duplicate copy of the information on the record card.

At 279° of the first card feed cycle, cam contacts C1 make to complete a circuit to magnet coil 58 for operating clutch 43 (see also Fig. 5), whereby a second card feed cycle is effected. At this time, the card feeding mechanism will cause the first card to be moved past the card sensing station 15 and the second card to be advanced into the bite of feed rollers 16—17. The advancement of a record card past the card sensing station will cause contacts SLC (see also Fig. 1) to close, whereby a circuit will be completed to contact roller 44 via make and break index point timing cam contacts CB1 and CB2. Thus, an index point timing pulse corresponding to the digit value represented by the hole in the second card, will be directed to an accumulator control magnet coil 62 if contacts R1*b* are transferred. Contacts R1*b* will be transferred during card data read time in the second machine cycle because relay R1 is maintained picked via cam contacts C2 until 180° of the second cycle.

An accumulator that may be employed here is shown and described in Lake et al. Patent No. 2,328,653 which issued on September 7, 1953. This accumulator must also have as a part thereof a readout structure such as the one shown and described in Brand et al. Patent No. 2,502,919 which issued on April 4, 1950, said readout structure being attached to and driven by the accumulator register mechanism. As is described in the aforementioned Lake et al. patent, this accumulator is controlled to add by a clutching means operated at a differential time of a card cycle corresponding to the representation of a digit on a record card, so as to connect the register device thereof to the accumulator drive mechanism. Either a mechanically or an electrically controlled clutch knock-off may be employed, although the latter is used in the preferred embodiment of this invention.

For example, if a value "9" is to be entered additively into the accumulator, the circuit to the accumulator add magnet 62 (Fig. 7) will be completed at 9-time by a circuit from line 53 through contacts CB1, CB2 and SLC, contact roll 44, a 9-hole in the record card, the reading brush 46 for the given card column, the plug wire connecting plug hubs 67 and 68, contacts R1*b* n/o, and accumulator magnet 62 to line 54. The accumulator register mechanism will then be rotated through nine digit representing steps after which an electrical impulse at zero time to the subtract magnet 63 via cam contacts CB5 and CB6 (see also Fig. 6), will cause an uncoupling of the clutch mechanism and the accumulator register device. Thus, to briefly summarize the operation of this accumulator, the time of accumulator clutch engagement is a variable dependent upon the value of the index point data on the record card, whereas the knock-off or disengaging period thereof occurs at a fixed point in the cycle represented by the energization of subtract magnet 63.

An accumulator readout distributor is shown in Fig. 7 to include common strip 64, a plurality of digit representing segments identified by the numerals 0–9, respectively, and a wiper arm 65. Inasmuch as the accumulator readout distributor is shown and described in detail in the afore-mentioned Brand et al. Patent, and since this structure per se is not a part of the subject invention, the same will not be described in detail herein. It should be understood, however, that if a digit value, such as four for example, is entered into the accumulator 48 (see also Fig. 5) controlled by add magnet 62, wiper arm 65 will be moved to a position to electrically connect the digit representing segment 4 and the common readout strip 64. Similarly, if a 9-digit is entered for addition into the accumulator, the common readout strip 64 will be connected to the digit representing segment 9 by the wiper arm 65. Hence, it may be seen that a circuit is completed to relay R3 (Fig. 7) only when the accumulator is reset to zero at which time wiper arm 65 electrically connects common readout strip 64 and the digit representing segment 0. As the description advances, the reason for this will become quite clear.

*Operation and summary*

Let it be assumed that the first record card 11 (Fig. 4) to be fed out of hopper 12 (see also Fig. 1) has a 1-digit representing hole in the control column thereof, a second record card 11*a* has a 5-hole therein and the third record card 11*b* has a 0-hole therein. Depression of the start key (Fig. 7) will cause energization of relay R10. The transfer of contacts R10*b* will then cause motor control relay HD to pick, whereupon contacts HD*a* and HD*b* will connect drive motor 41 across power source 40. The operation of motor 41 will cause all C cam contacts and CB cam contacts to operate so that at approximately 279° a circuit will be completed to clutch magnet 58 via contacts C1, R10*c* and R2*a*. As a result of the energization of magnet 58, the clutch 43 will unlatch and the card feeding mechanism will start operating at 306°. Inasmuch as cam contacts CF1 are operated only during the period that the card feeding mechanism is effective, relays R1P and R2P will be energized from 324° to 355° of the first card feed cycle. Relay R1 will be maintained picked via cam contacts C2 which separate at approximately 180°. Relay R2, on the other hand, will remain picked until relay R3 is energized in order to separate contacts R3*a* and open the relay R2H circuit. At the end of the first cycle, the first record card 11 having a 1-hole therein will be advanced to a position just ahead of the card sensing station 15.

Clutch magnet 58 will be energized to cause a second card feed cycle inasmuch as relay R10 is still picked, and since relay R2 dropped out at 198° when cam contacts C4 caused relay R3 to pick and, in turn, contacts R3*a* to separate. Hence, during the second cycle the first record card will be moved through the card sensing station 15, whereupon the 1-hole punched therein will be sensed during the time that contacts SLC are closed by the governing card lever. The accumulator input circuit will be completed then from line 53 through contacts CB1, CB2 and SLC, sensing station 15, the plug wire connecting hubs 67 and 68, contacts R1*b* n/o, and magnet 62 to the other side of the line. Relay R1 will be energized at 1-index point time inasmuch as relay R1P will have been picked at approximately 324° of the second card feed cycle, and relay R1H will remain energized until 180°.

The entry of a 1-digit value into the accumulator controlled by magnet 62 will cause the wiper arm 65 to be moved to a position where digit representing segment 1 is caused to be connected to the common strip 64. Hence, when cam contacts C4 close at 198°, a circuit to relay R3 will be open. As a result, relay R2 will remain energized, having been picked at 324° along with relay R1P. At the end of the second card feed cycle, the first record card 11 will be at a position just ahead of the optical scanning station 25 and the second card 11*a* will be at a point just ahead of the sensing station 15.

Inasmuch as relay R2 will be up during the time in the second cycle that cam contacts C1 are closed, clutch magnet 58 will not be energized and the card feeding mechanism controlled thereby will be disabled and latched at 306°. The continuously operating feed rollers, however, will cause the first card to be advanced during the third machine cycle through the optical scanning station 25 for a first time. Furthermore, since normally open contacts R2*c* are in the circuit for card distribution magnet 59, this magnet will be energized at approximately 230° of the second card feed cycle when cam contacts C5 make. Thus, during the third machine cycle, the first record card will be advanced through the scanning station 25 and over deflector 71. This scanning operation will cause a latent electrostatic image 120 (Fig. 4) to be formed on xerographic drum 34.

The operation of the continuously rotating card feed rollers is such that the first record card 11 will be advanced around the loop defined by member 72 (Fig. 1) so that at the end of the third machine cycle the leading edge of the card is at a position just ahead of the scanning apparatus at station 25.

During the third machine cycle when cam contacts CB3 (Fig. 7) and CB4 close at 9-index point time, a 9-digit is entered into the accumulator controlled by magnet 62 via contacts CB3, CB4, R2*d* and R1*b* n/c. It will be recalled that relay R1 is not energized during this machine cycle whereas relay R2 is energized. The entry of the 9-digit via the afore-described digit manifesting means into the accumulator which prior to this entry had a 1-digit stored therein, will cause the accumulator register mechanism to return to a zero setting whereby wiper arm 65 will connect the digit representing segment 0 and common strip 64. As a result, at 198° when cam contacts C4 close, relay R3 will be energized from line 53 through contacts C4 and wiper arm 65. This will cause contacts R3*a* to separate and relay R2 to drop out. At 230° of the third machine cycle when cam contacts C5 close, the now separated contacts R2*c* will prevent a circuit to card distribution magnet 59. As a result, the deflector 71 which was mechanically moved to a latched position at 180° of the third cycle will be in a position such that a record card passing through the optical station 25 during the fourth machine cycle will be advanced below the deflector and in the direction of stacker 14.

At 279° of the third machine cycle, cam contacts C1 will close to complete a circuit to clutch magnet 58. This will cause the card feeding mechanism to be coupled to the drive mechanism therefor so that during the fourth machine cycle, i. e., third card feed cycle, the first record card which has just completed passing around the loop defined by member 72 will be moved through the optical scanning station 25 for a second time, under deflector 71 and into the bite of feed rollers 21—22. During this time, the printed information on the first record card will be scanned for a second time by the apparatus in scanning station 25, whereby a latent electrostatic image 220 (see also Fig. 4) will be impressed upon the photoconductive layer of xerographic drum 34.

During the fourth machine cycle or third card feed cycle, the second record card 11*a* having a 5-hole punched therein will be moved past the sensing station 15, whereby a 5-digit value will be entered into the accumulator controlled by magnet 62 via the afore-described circuit including contacts R1*b* n/o. Relay R1 will be energized during this time of the cycle inasmuch as cam contacts CF1 are closed at 324° of a card feeding cycle.

The entry of a 5-digit value into the accumulator will cause the wiper arm 65 thereof to be moved to a position whereat the digit representing segment 5 and common strip 64 will be electrically connected. Hence, inasmuch as relay R3 will not be energized when cam contacts C4 make during 198° to 216° of the fourth machine cycle, relay R2 will remain picked. It will be noted that both relays R1P and R2P were picked during the fourth machine cycle when cam contacts CF1 closed at 324°.

At the end of the fourth machine cycle, the third record card 11*b* (see also Fig. 4) will be stopped at a point just ahead of sensing station 15 (see also Fig. 1), whereas the second record card will be moved to a position just ahead of the scanning apparatus in station 25. During the fifth machine cycle, the second record card will be moved through the optical scanning station and over deflector 71 inasmuch as the control magnet 59 therefor was energized at 230° of the fourth machine cycle. Furthermore, during the fifth machine cycle the latent electrostatic image 120*a* (Fig. 4) will be formed on drum 34, and a 9-digit will be entered into the accumulator controlled by magnet 62 via the CB3, CB4, R2*d* and R1*b* n/c contacts. The 9-digit value will cause the accumulator distributor wiper arm 65 to be moved from the digit representing segment 5 to the segment 4. Thus, once again when cam contacts C4 make at 198°, relay R3 will not be energized and accordingly relay R2H will not be de-energized. Due to this fact, the clutch control magnet 58 will not be energized during the fifth machine cycle, whereas the card distribution magnet 59 will be energized at 230° of the fifth machine cycle. Hence, the second record card will be advanced in the recirculating loop defined by the element 72 (see Fig. 1) during the sixth machine cycle at which time another 9-digit value will be entered into the accumulator. Now the wiper arm 65 will be moved from the digit representing segment 4 to the segment 3. In a similar fashion during the seventh machine cycle the wiper arm will be moved from segment 3 to segment 2, and during the eighth machine cycle the wiper arm will be moved from digit representing segment 2 to the segment 1. During the ninth machine cycle, the entry of another 9-digit value into the accumulator will cause the wiper arm 65 to be moved from the digit representing segment 1 to the segment 0. As a result, when cam contacts C4 close at 198° a circuit will be completed to relay R3 whereupon, at this time, relay R2H will be de-energized by the separation of contacts R3*a*. Hence, contacts R2*a* will be closed at 279° of the ninth machine cycle, and the clutch control magnet 58 will be energized to effect another card feeding cycle.

During the tenth machine cycle, i. e., the fourth card feed cycle, the second record card will be moved past the optical scanning station for a sixth and last time inasmuch as the circuit to card distribution magnet 59 was open at approximately 230° of the ninth machine cycle when cam contacts C5 closed. Thus, during the tenth machine cycle the second record card is moved under deflector 71 and towards card hopper 14. At this time, the third record card 11*b* having a 0-hole punched therein is moved past the card sensing station 15 and to a position just ahead of the optical scanning station 25. Inasmuch as this last record card has a 0-hole punched therein, the control magnet 62 will be energized along with subtract magnet 63 at 0-index time. The concurrent energization of magnets 62 and 63 will result in no movement of the accumulator register device and the wiper arm 65 will remain in contact with the digit representing segment 0 and common strip 64. Thus, when cam contacts C4 make at 198°, relay R3 will be energized and relay R2H will, in turn, be de-energized. In addition, the card distribution control magnet 59 will not be energized at 230° of the tenth machine cycle because contacts R2*c* will be separated. Hence, the third record card having a 0-hole punched therein will be moved through the optical scanning station only once, and under deflector 71 towards stacker 14.

In summation, it may be stated that there will always be at least one duplicate copy of a source record card, printed by the xerographic printer. To print more than one duplicate copy of a source record card, a digit value corresponding to the number of copies desired in excess of one must be recorded on the record card in a position to be read by sensing station 15. Thus, if only one duplicate copy is desired, only a 0-hole need be punched in the record card; if two duplicates are desired, only a 1-digit value hole need be punched in the record card; and if six duplicates are wanted, a 5-digit value hole must be punched in the record card. It is apparent then that in the preparation of duplicate copies as provided for by the subject xerographic printer, there may be any number of copies printed for a given source record card. It should be clear that any number of accumulator read-out distributors may be connected in series circuit with relay R3 so that this relay will be picked only when all of the accumulators are at a zero setting.

Figure 2:
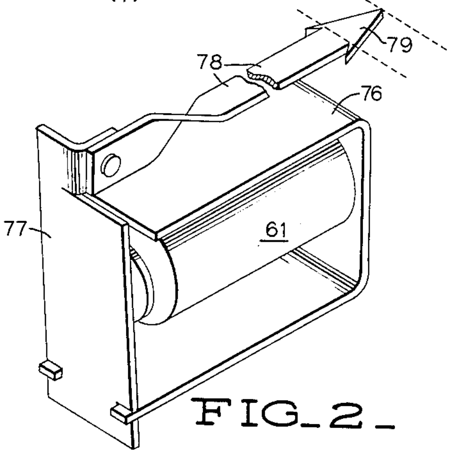
Fig. 2 is an isometric view of an apparatus for effecting an identifying mark on a printed copy when the apparatus control magnet is operated.

Inasmuch as it might be desirable to sort out, for example, at least one printed duplicate copy of each source record card, a means to particularly identify the first printed duplicate copy of each group is highly desirable. A mechanism for accomplishing this function is shown in Fig. 2, and the control circuit therefor is shown in Fig. 7. Referring first to the mechanism shown in Fig. 2, a magnet 61 is attached to a suitable yoke-frame member 76 which has an armature 77 pivotally mounted at one end thereof. This armature has fixed to the upper movable end thereof an extending member 78, the arrow-shaped tip 79 thereof being capable of movement into the optical scanning line of station 25 (see also Fig. 1). That is, if magnet 61 is energized to attract armature 77 thereto, the tip 79 will be moved into the optical path of station 25 so as to project the equivalent of a mark onto a portion of the surface of xerographic drum 34. This mark 35 (Fig. 4) as finally developed on the printed duplicate copy may readily be detected by a photoelectric sorting device, for example.

Referring to Fig. 7, the control circuit for magnet 61 is seen to include cam contacts C3 and relay contacts R9*c*. Inasmuch as cam contacts C3 are closed at 342° and until 180°, magnet 61 will be energized only during this interval of time and while a record card is being moved through the optical scanning station 25 for the first time, i. e., when relay R9 is maintained picked during a machine cycle following a card cycle. This relay is energized when contacts R2*c* are closed, and will remain energized until 189° of the next machine cycle via contacts C10 and R9*a*. Hence, when cam contacts C3 close, a circuit will be completed to magnet 61.

A print receiving web 89 is shown in Fig. 4 to include a number of printed duplicate copies; copies 1020 and 2020 being printed to duplicate the information 20 on record card 11 having a 1-digit "number-of-copies" hole punched therein, and the remaining copies 1020*a*–4020*a* being printed to duplicate the information 20*a* on card 11*a*. Due to the marking mechanism being effective during the projection of the first optical image onto xerographic drum 34, the first copies 1020 and 1020*a* of their respective groups are identified by marks 35 for easy sorting.

It may be desirable at times to print the same number of copies for each source record regardless of the "number-of-copies" data carried on the record. To accomplish this operation, hubs 67 and 68 are disconnected whereas hubs 66 and 91, and 92 and 68 are connected by plug wires. Box 93 represents a distributor similar to the readout distributor for the accumulator. The mechanism for moving the wiper arm for distributor 93 is connected to the card feeding mechanism 45 (see also Fig. 5) so that the arm contacts a digit representing segment similar to segments 0–9 at a time corresponding to the machine digit index point time. Hub 92 is connected to the digit representing segment corresponding to the number of duplicate copies desired whereas hub 91 is connected directly to the wiper arm. Thus, if hub 92 is connected to the five digit representing segment of distributor 93, a five impulse will be directed to accumulator magnet 62 during a card feed cycle via contacts CB1, CB2 and SLC, the plug wire connecting hubs 66 and 91, distributor 93, the plug wire connecting hubs 92 and 68, contacts R1*b* n/o, and magnet 62. Six card scanning operations will then follow to effect six printed duplicate copies before another card feed cycle will ensue.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A record controlled electrophotographic printing machine of the class described comprising a record hopper and a record stacker; means for sensing discrete index points of record data; means for scanning information marked on the surface of a record; first means for feeding records from said hopper past said sensing and said scanning means to said stacker; means for storing electrostatic charge patterns in the configuration of images of record information; means for operatively connecting said scanning means and said image storing means whereby an electrostatic charge pattern in the configuration of an image of record information being scanned is stored in said storing means; second means for feeding records in a closed path past said scanning means; record distributing means interposed between said scanning means and said stacker, and when operated adapted to direct records from said first feeding means to said second feeding means; and means controlled by said record data sensing means for operating said record distributing means so that the record sensed is directed to said second feeding means.

2. A machine according to claim 1 wherein said last-named means include an accumulator having a read-in register operatively connected to said data sensing means so as to store said discrete index points of record data, and a readout distributor operatively connected to said record distributing means, whereby a record is directed to the closed path of said second feeding means when a data value other than zero is stored in said accumulator.

3. A machine according to claim 2 additionally comprising a drive means; a clutch for coupling said drive means to said first feeding means; and an electromagnet for controlling said clutch operatively connected to said accumulator readout distributor so that said clutch is uncoupled when a data value other than zero is stored in said accumulator.

4. A machine according to claim 2 additionally comprising a digit manifesting means; and a means for operatively connecting said digit manifesting means and said accumulator read-in register during a machine cycle that a record is advanced by said second feeding means so that the data value stored in said accumulator is decreased each machine cycle by a value of one.

5. A machine according to claim 4 additionally comprising a transfer switch having a normally open contact connected to said digit manifesting means, a normally closed contact connected to said data sensing means, and a transfer contact connected to said accumulator read-in register; a magnet for controlling said switch; and timing means controlled by said first feeding means for governing said magnet so that said magnet is operated in response to the operation of said first feeding means.

6. In a record card controlled printing machine of the class described, the combination of record card indicia sensing means, record card information scanning means, first means operable to feed record cards past said sensing and said scanning means, second means operable to feed record cards in a closed loop past said scanning means, means including a rotatable drum for storing images of record card information, optical means for operatively connecting said scanning means and said image storage means, means for rotating said drum relative to said optical means at a speed correlated with the speed of feeding record cards so that an image of record card information is entered for storage in said storage means, means operable to direct record cards from said first feeding means to said second feeding means, and means controlled by said sensing means for governing the operation of said last-named means so that select ones of said record cards are directed to said second feeding means.

7. A record card controlled electrophotographic printer comprising means for sensing discrete index points of record card data; means for scanning information marked on the surface of a record card; record card distributing means; drive means; first means operable to feed cards past said sensing means and said scanning means to said distributing means; second means connected to said drive means for feeding cards in a closed loop from said distributing means past said scanning means; an electrostatically charged photoconductive insulating member; an optical system for operatively connecting said scanning means and the surface of said member so as to produce an electrostatic charge pattern thereon; means for moving said photoconductive insulating member relative to said scanning means in a timed relation to the feeding of record cards past said scanning means so as to produce a latent electrostatic image of record card information on the surface of said member; means controlled by said sensing means for coupling said drive means to said first feeding means when said card data has a value of zero; and other means controlled by said sensing means for controlling said card distributing means so that a card is directed to said second feeding means when said card data has a value other than zero, whereby another latent electrostatic image of information on a record card is caused to be produced.

8. A multi-copy printing machine of the class described comprising an electrophotographic member capable of storing an electrostatic charge pattern in the configuration of an optical image projected thereon, means for sensing record card index point data designations, means for scanning printed information on a record card, optical means associated with said scanning means for projecting the image of record card printed information onto said member, a card hopper, a card stacker, first card feeding means to advance said cards, one by one, from said hopper past said card sensing and said scanning means to said stacker, second card feeding means to move select ones of said cards in a closed recirculating path past said scanning means, means for moving said member in a timed relation to the moving of record cards past said scanning means, and means controlled by said data sensing means for rendering effective said second card feeding means and disabling said first card feeding means, whereby an electrostatic charge pattern similar to a next preceding charge pattern in the configuration of the printed information on a single record card is stored on the surface of said member.

9. A machine according to claim 8 additionally comprising an electromagnetically governed marking element so constructed and arranged as to be movable into and out of the projected optical path of an image of record card printed information, and timing means controlled by said first card feeding means for rendering said electromagnetically governed marking element operated.

10. A machine according to claim 9 additionally comprising another timing means controlled by said second card feeding means, and a delay circuit arrangement controlled by said another feeding means for rendering said electromagnetically governed marking element operated for one machine cycle following the disabling of said first feeding means.

No references cited.